Aug. 6, 1968 R. DIDIC 3,396,373

FERRITE RING CORE DATA TRANSMITTER

Filed April 23, 1964

Inventor
Radoslav Didič
By Silverman & Cass
Attorneys

United States Patent Office 3,396,373
Patented Aug. 6, 1968

3,396,373
FERRITE RING CORE DATA TRANSMITTER
Radoslàv Didić, Sandweg 21, Bad Hersfeld, Germany
Filed Apr. 23, 1964, Ser. No. 362,060
Claims priority, application Germany, May 2, 1963, Z 10,095
3 Claims. (Cl. 340—174)

ABSTRACT OF THE DISCLOSURE

A memory matrix having a plurality of bistable magnetic cores possessing a substantially rectangular hysteresis characteristic. A readout line is coupled to all cores in each matrix, each row having its individual line. Each matrix column is coupled to an individual exciter line. An information line is selectively coupled to some cores and bypasses other cores. A first and second current pulse are simultaneously impressed on the information line and on one selected exciter line respectively. The current pulses have substantially equal amplitude, equal duration, but opposite polarity. The current pulse on the selected exciter line is sufficient for changing the stable state of the bypassed cores coupled thereto and inducing readout pulses through the appropriate readout lines. The selected exciter line subsequently applies to all its associated cores a third pulse of equal magnitude but opposite polarity to the second current pulse and returns the bypassed cores to their former magnetic condition.

This invention relates to a data transmitter which permits repeated interrogation for data stored therein without impairment of data stored therein. Such a data transmitter can be used in data processing systems as program registers and may be used for information storage, coding units and the like.

The data transmitter embodying the present invention utilizes as information storage elements ferromagnetic (usually ferrite) rings or loops of material having a rectangular hysteresis magnetization cure characteristic capable of assuming a stable state of magnetization of controlled polarity. The core elements are generally arranged in the form of a two-dimensional matrix. Any number of matrices can be arranged in two or three-dimensional groupings. Core elements in a matrix are usually in a geometrically regular array having rows and columns. Each core element has a plurality of windings linking or coupling the same. A winding may be reduced to elemental form as a single current conductor threaded through its core. It is understood that a core can assume a stable magnetic condition as the result of suitable magnetizing force. It is also understood that the words magnetize and de-magnetize as used in this application are defined as opposite states regardless of algebraic sign.

The present invention is an improvement upon prior data transmitter systems as exemplified by the system disclosed in German Patent No. 1,108,956. A conventional matrix core arrangement is disclosed in this patent. In prior systems, the core winding circuit arrangements requires an exciting pulse of controlled magnitude on a selected exciter line to generate a read-out pulse in the appropriate core winding in a read-out line for information retrieval. In such prior systems, the controlled magnitude of exciter pulse current must be no more than one-half of magnetizing current required to put a core in a stable magnetized state. The exciter pulse must be coincident with a pulse of equally controlled current magnitude provided by an information line during read-out. It is understood that pulses appear in read-out lines.

In such prior systems, after a signal read-out, the matrix cores are restored, insofar as magnetic conditions are concerned, to their prior magnetic conditions existing before signal reading. However, such prior systems may be reset in three different possible manners after read-out:

(1) On the same exciter and information lines concerned with read-out will be impressed a current of equal intensity but of opposite direction in order to reset the cores to the prior magnetic state.

(2) A reset line including special core reset windings or conductors threaded therethrough may have impressed thereon a pulse of full normal core magnetizing current amplitude, double that which should be used for the coincidence method mentioned before (1).

(3) The row-line pre-excited for read-out a current pulse is impressed thereon, whose intensity is the double magnitude as in (1) and the direction opposite to the read-out current pulse.

To realise the first contingency, both exciter line system and information line system in prior systems must include polarity reversing or polarity control means. To realise the second contingency, an additional winding per core is necessary and is provided in prior systems. The third contingency has been met in prior systems by equipping the exciter line system with means for reversing the polarity of the current pulses and at the same time doubling the pulse current amplitude.

The present invention improves upon prior systems and eliminates their disadvantages which consist in the low signal-to noise ratio of the read-out pulses available with the coincidence method and in the slower operation speed or in additional operation steps necessary in those core memories known heretofore. It is an object of the present invention, to reduce the noise level and to improve the operation speed of a core memory especially by not necessitating resetting of all of the cores.

This improvement is accomplished by circuitry and control means for returning after each read-out the entire data transmitter to a ready-to-read state without the necessity for resetting lines and resetting windings relying only on polarity reversal for exciter lines and their windings.

The invention will now be explained in connection with the drawings wherein.

Figure 1:
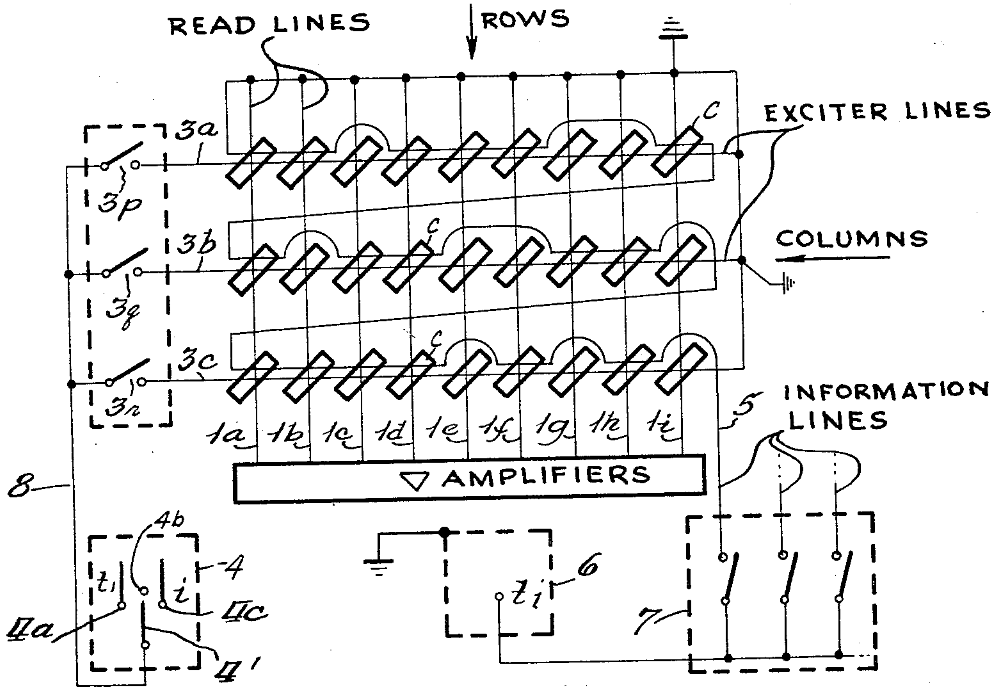
FIG. 1 is a diagrammatic representation of an array of information storage or memory cores forming a part of a matrix, the figure also showing the various lines and associated parts for system operation.

The system illustrated in FIG. 1 can be a small part of a complete, more elaborate system and, as illustrated, has nine read lines 1$a$ to 1$i$ inclusive. Each read line, as for example, 1$a$, includes in-circuit read line core windings or read conductors threaded through ring-shaped cores $c$ of ferromagnetic material. As previously indicated, each ring core $c$ can be permanently magnetized to a stable magnetic condition, of desired polarity. For convenience, the read line is shown as threaded through each core. For convenience, cores $c$ threaded through by any one read line, as 1, will be designated as a row of cores. A line of cores at right angles to a row will be designated as a column. 27 cores are illustrated in 9 rows of 3 cores, or 3 columns of 9 cores. There is no significance to the number of cores in a row or in a column or to the numbers of rows or columns.

Read lines 1$a$ to 1$i$ inclusive are connected between amplifiers 2 and ground. Amplifiers 2 function to amplify a pulse appearing in a read line, and many also include signal storage means. Preferably, amplifiers 2 are transistorized.

An exciter line threads each column of cores, there being a separate exciter line for each core column. It is understood that in a complete matrix, an exciter line might go through every core in a column or a predetermined number of cores to form a column. The same applies to the read lines for the cores in a row. Exciter lines *3a*, *3b* and *3c* have a common terminal connected to ground and have their respective high potential (left) ends connected to individual control switches *3p*, *3q* and *3r*. The exciter line switches form part of an address register system, shown by the dotted rectangle, this being a well known adjunct of the data transmitter. The switch showing is symbolic, since in practice, electronic switching utilizing transistors or the like will be employed. Exciter line switches *3p*, *3q* and *3r* are connected to common current supply line 8. The exciter switch arrangement is such that no more than one exciter line at any one time can be connected to supply line 8.

Supply line 8 goes to current source 4 of proper voltage through switch means 4', more fully explained below, for controlling the polarity of current impressed on supply line 8.

The switching combinations for exciter lines, including switching ground connections (switches may be provided for controlling the grounding of each exciter line), may be varied to suit requirements. However, an important feature of the present invention resides in the fact that, subject to control by the address register of the switch means 4', the polarity of exciter current may be reversed. An additional important feature of the present invention is that the magnitude of exciter current (pulse amplitude) can be constant and only needs to be sufficient to magnetize or de-magnetize the cores affected thereby.

In addition to read and exciter line systems, there is provided at least one information line system 5. Like each of the other line systems, the information line system includes serially connected core windings or a conductor portion threading cores. Information line system 5 is not limited to rows or columns but engages selected cores in various rows and various columns. As with reading lines and exciter lines, an information line system may include separate information lines for different parts of a complete matrix. Information line 5 bypasses some cores and threads other cores. Those cores bypassed by line 5 cannot be affected by line 5. The pattern for core bypass or core engagement or threading for information line 5 depends upon desired system operation. Those cores bypassed by a particular information line will be active for read-out for that information line. It is understood that cores threaded or bypassed by information line 5 can be threaded or coupled to a different information line.

Information line 5 has one terminal grounded. The high potential (ungrounded) end of information line 5 is connected through switch means 7 to current source 6. Switch means 7 may have a plurality of switch sections to control additional information lines. Insofar as the core array illustrated is concerned, only one information line (if more than one information line is provided) at any one time is energized from current source 6. It is possible that an elaborate matrix may have many information lines, as well as many exciter lines and many read lines, so that different parts of a matrix may function simultaneously and independently. However, for a functionally coherent array of storage or memory elements (cores and windings), the condition that only one information line (and only one exciter line) be active at any time holds good and is well understood in this art. Switch means 7, as illustrated, is symbolic and can be electronic and can use transistor or similar devices for high speed. Switching of information line 5 (or lines) and exciter lines *3a*, etc., must be synchronized and correlated to effect the selection of a desired storage element or core out of a complete array of elements. This is conventional procedure in this art and is controlled by the address register.

The mode of operation of the new system will now be described in conjunction with FIG. 2. Curve A shows a succession of square waves providing potential plotted against time. Potential A1 indicates an address set condition during which one exciter line (*3a*, *3b*, *3c*, etc.) and one information line may be energized respectively by connection to their respective potential or current sources 4 and 6. The pairing of a particular exciter line with a particular information line for energization depends upon the address register and will vary with time. Thus parts A1 and A3 do not necessarily mean that the same exciter line and same information line are energized during these two pulse periods. Part A2 of curve A indicates a quiescent or unset condition of the address part of the entire system.

The switching means for current source 4 provides for three possibilities. Switch contacts 4*a* and 4*c* provide for application respectively of positive and negative currents from source 4 on line 8. Switch contact 4*b* is dead. It is understood that ground returns for sources 4 and 6 will be provided. The switch means for current source 4 may be of any type and should provide the desired switch conditions for establishing a desired one of the three possible circuit conditions previously described at controlled times. One switch condition, depending on polarity, is where the current source is connected to line 8 and permits read-out. The reverse polarity obtained by changing the condition of switch 4' will be for re-magnetizing or recharging interrogated cores. The dead switch position is useful for stopping momentarily and is provided as an intermediate switch condition between either of the two live connections provided by contacts 4*a* and 4*c*.

Figure 2:
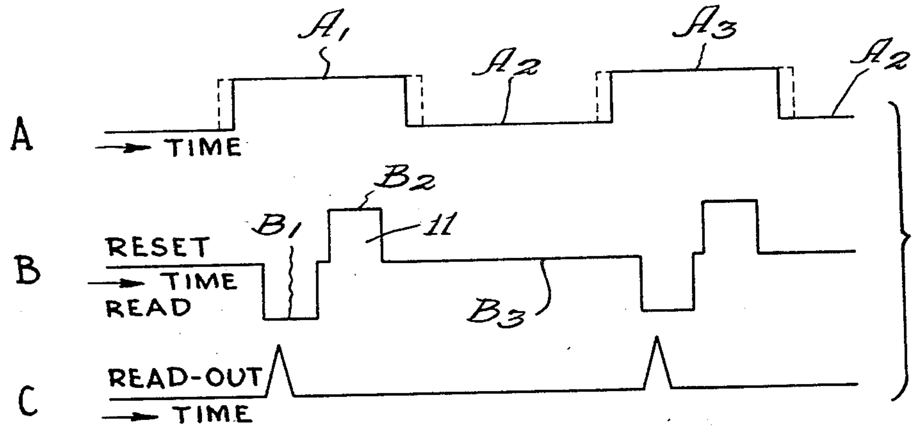
FIG. 2 shows three time-current pulse diagrams illustrating the mode of operation of the system of FIG. 1.

Switch means 4' is operated in such a manner that output line 8 going to the address part of the system contains positive and negative pulses as illustrated in curve B of FIG. 2, the negative pulses being shown by B1 and the positive pulses being shown by B2. The horizontal line B3 of the curve represents no potential on line 8 when dead switch contact 4B is momentarily engaged. Assuming that the address part of the system containing switches *3p*, *3q*, *3r*, etc., operates to close one of these exciter line switches (power source 4 is connected to line 8), a current pulse is emitted from current source 4 along line 8 to the selected exciter line. The amplitude of this current pulse is sufficient for de-magnetizing a core to a stable state. Insofar as core magnetization is concerned, it is to be understood that a core is either fully magnetized (the polarity being subject to control) or is de-magnetized and that the core can remain in such a condition of either magnetization or de-magnetization indefinitely.

A system embodying the present invention does not utilize magnetizing currents of less than full effective amplitude, hence negative pulse B1 sent out along line 8 to an exciter line (as, for example, *3a*) would result, in the absence of other current pulses, in de-magnetizing the cores in the top column threaded by line *3a*. Before the energization of an exciter line by current pulse B1 (assumed, for example, to be on line *3a*), switch 7 has been operated in order to energize one of whatever information lines it controls—in this particular situation, only one line 5 being illustrated. Switch 7 is so controlled that a current pulse illustrated in curve A of FIG. 2 is impressed from source 6 upon information line 5. The direction of current flow through the parts of information line 5 linked to the cores (the parts of the information lines that bypass a core is ineffective on such bypassed cores) is such that the de-magnetizing action of pulses B1 on an exciter line is substantially neutralized by the magnetizing action of the simultaneous current pulse on the information line. This magnetic neutralizing action on ferrite core storage elements is similar to that known in the computer art.

Considering for example the cores in the top column threaded by exciter line *3a*, it will be clear that the three cores threaded by read lines *1c*, *1g* and *1h* are the only cores which will have their bagnetic condition changed by the unneutralized current pulse on information line 5. As to those bypassed cores in the top column, pulse B1 will have the effect of inducing a current in read lines *1c*, 1g and 1h (as shown in curve C in FIG. 2), assuming that those cores are in a magnetic condition where they can function as a ferromagnetic link between the exciter winding or conductor and the read winding or conductor. The amplitude of the pulse on the information line is substantially equal to the amplitudes of the pulses illustrated in curves A and B and will suffice for complete magnetization of the core by itself.

Reading out the cores in the top column, and assuming that 1 corresponds to a core of changed magnetization and 0 corresponds to an unchanged core, one obtains as the read-out figures 001000110.

Immediately after read-out of the top column of cores, the de-magnetized cores bypassed by information line 5 and showing 1 for each core on read-out, can be re-magnetized by reversing the polarity of current from source 4. This reversed polarity is applied as a pulse, shown as B2 in FIG. 2. This is obtained by the operation of reversing current source 4 under the register control.

During the time when exciter line 3*a*, in the assumed example, and information line 5 are both energized, the cores in other inactive columns which are threaded by line 5 (as, for example, the cores in read lines 1*a*, 1*b*, 1*c* and 1*d* and in the third or lowest column (for exciter line 3*c*) will be affected by the information current pulse. However, the magnetic effects on such cores is of no consequence due to the brief pulse duration and reverse pulse polarity. Such cores are momentarily saturated with reverse polarity and the effect is not permanent.

Thus it is evident that a polarity current reversal for the group of exciter lines is necessary to magnetize the de-magnetized cores. The polarity of pulses on the information line should not be reversed, which can be insured by rectifiers in current source 6. During the time of de-magnetization of cores, switch 7 can select and excite a different information line.

An advantage of the invention resides in the large tolerances of current pulse magnitudes. Since the mode of operation of the invention involves anti-coincidence selection, minimum magnetizing current values can be used. This is in marked contrast to the half pulse peak coincidence mode of prior systems.

It is believed the invention should be understood by those skilled in this art, and it is pointed out that variations may be made without departing from the spirit or scope as defined in the appended claims.

What it is desired to secure by Letters Patent of the United States is:

1. A data transmitter system having ring cores of ferromagnetic material of the type having a generally rectangular hysteresis curve, said cores being arranged in a two-dimensional geometrical array, the cores along one dimension being in rows, the cores along the other dimension being arranged in columns, a separate read line coupled to all cores in a row, each row of cores having its individual read line, address-controlled exciter lines for the core columns, each column having an individual exciter line, each said exciter line being coupled to every core in its column; at least one information line coupled to certain cores in rows and columns and bypassing other cores in rows and columns; means for simultaneously impressing, a first current pulse along said information line and a second current pulse along said selected exciter line, said first and second current pulses having substantially equal amplitude, equal duration, and opposite polarity; said second current pulse being sufficient for demagnetizing all cores along said selected exciter line bypassed by said one information line, thus inducing read pulses through those of said read lines coupled to said bypassed cores along said selected exciter line.

2. The system as defined in claim 1 wherein means are provided for passing through said selected exciter line, after a reading operation, a third current pulse of equal magnitude but of opposite polarity to said second current pulse whereby those of said bypassed cores which had been de-magnetized by said second current pulse are re-magnetized and restored to their former magnetic condition.

3. The system as defined in claim 1 wherein switching means are provided for connecting a direct current source to said selected exciter line, said switching means including means for impressing said second current pulse on said selected exciter line and thereafter reversing the polarity of said current source to impress said third current re-magnetizing pulse on said selected exciter line.

References Cited

UNITED STATES PATENTS

| | | | |
|---|---|---|---|
| 3,229,266 | 1/1966 | Rajchman | 340—174 |
| 2,968,029 | 1/1961 | Grosser | 340—174 |

BERNARD KONICK, *Primary Examiner.*

P. SPERBER, *Assistant Examiner.*